J. C. GARRETSON.
Wheels for Vehicles.
No. 143,233. Patented September 30, 1873.
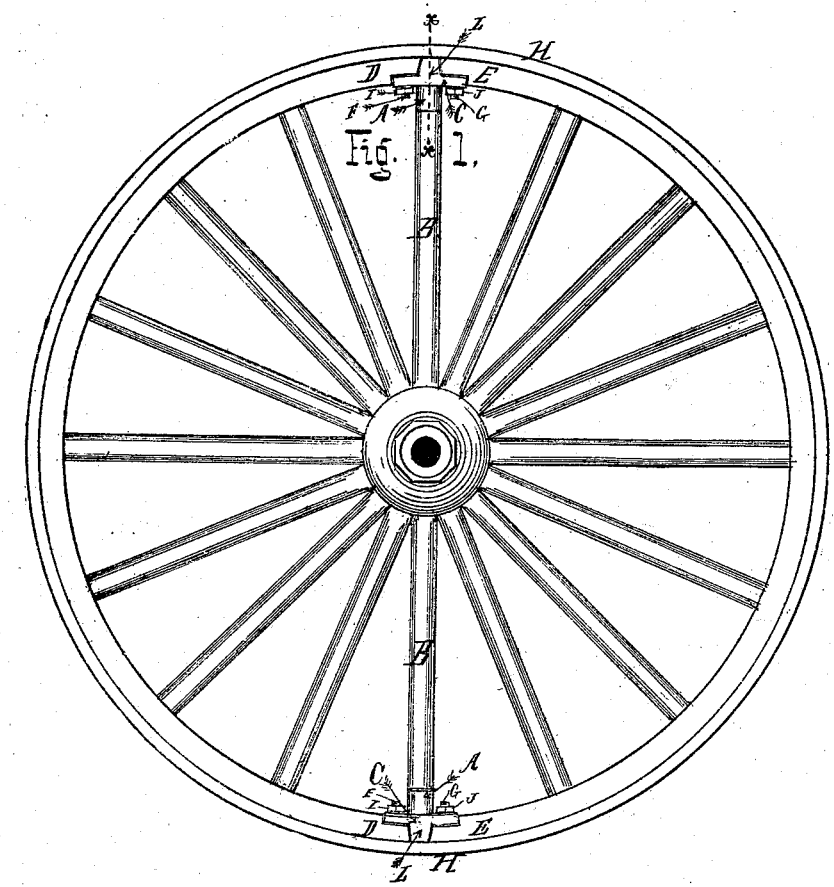
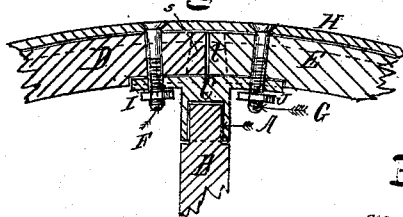
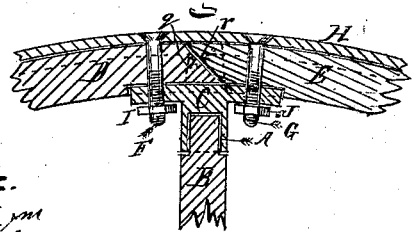
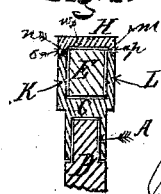
Witnesses:
Richard Gerner
Franklin Barritt
Inventor:
Jacob C. Garretson
Per Henry Gerner
Atty

UNITED STATES PATENT OFFICE.

JACOB C. GARRETSON, OF MARSHLAND, NEW YORK.

IMPROVEMENT IN WHEELS FOR VEHICLES.

Specification forming part of Letters Patent No. 143,233, dated September 30, 1873; application filed August 23, 1873.

*To all whom it may concern:*

Be it known that I, JACOB C. GARRETSON, of Marshland village, county of Richmond, Staten Island, State of New York, have invented certain Improvements in Wheels, of which the following is a specification:

The object of my invention is, first, to provide for a convenient, cheap, and durable fastening for the connection of the fellies in the wheels, constructed on similar principles as those for which Letters Patent No. 126,389 were granted to me under date of May 7, 1872; and, secondly, to provide for an improved tire which will more accurately fit and strengthen such wheels with less screws or rivets than the heretofore-used tires. My invention consists, first, in casting a fastening or connection for the fellies where they come together in such a manner that the flanges are formed on the outer extremity of the fastening, which receives both ends of the fellies, which are alternately so formed that a pair are cut off straight, or at right angles to the base of the fastening, and another pair at acute angles to the said base, so as to bring the upper end of one of the fellies to bear down upon the lower end of the other, so as to form a wedge between the base of the fastening and the inside of the tire. The ends of these flanges are pointed, so as to be placed inside the flange of the tire, which prevents dislocation of the fastening as well as the fellies. These flanges are outside flush with the fellies, and extend upward from the base, which is underneath both ends of the fellies, and is held thereto by two bolts, the heads of which are countersunk on the outside of the tire, and which extend downward through the fellies and have nuts on the threaded ends under the base. To the lower end of the base is cast a socket which receives one of the spokes of the wheel. By expanding the spokes in the hub the spoke in the socket will be forced up into the same and thus force the fastening and the fellies up against the tire of the wheel, making a strong and secure fastening of the several parts. My second improvement consists in forming the tire of the wheel hollow, or with flanges on the outer portion, where the tire is placed over the fellies. In order to fit the fellies the upper square edges of said fellies are removed so as to conform exactly with the groove in the tire. It will be readily understood that the tire is placed around the fellies before the spokes are expanded, and not shrunk in the ordinary manner.

In order more fully to describe my invention, I refer to the accompanying drawing forming a part of this specification.

Figure I is a side view of a wheel embodying my invention. Fig. II is a detached enlarged sectional view of one of the fastenings. Fig. III is a detached enlarged sectional view of the other fastening. Fig. IV is a sectional view through line $x\,x$, Fig. I.

A is the socket of the fastening, in which the spoke B is inserted. C is the base of the fastening underneath the ends of the fellies D and E. F and G are two bolts with heads countersunk in the tire H and with nuts I and J at the opposite threaded ends. K and L are the flanges of the fastening, pointed at $m$ and $n$ underneath the flanges $o$ and $p$ of the tire H, forming a groove, W. $q$ and $r$ are the acute angles of the ends of the fellies D and E. $s$ and $t$ are the ends cut off straight at right angles of the fellies D and E.

Having thus described my invention, I claim—

A spoke and felly fastening, consisting of socket A, base C, and flanges K and L having beveled edges $m$ and $n$, bolts F and G with nuts I and J, in combination with the spoke B, fellies D and E, and tire H having flanges, substantially as and for the purpose hereinbefore set forth.

JACOB C. GARRETSON.

Witnesses:
RICHARD GERNER,
FRANKLIN BARRITT.